(12) United States Patent
Yamaki et al.

(10) Patent No.: US 8,033,602 B2
(45) Date of Patent: Oct. 11, 2011

(54) VEHICLE SEAT

(75) Inventors: Jogen Yamaki, Utsunomiya (JP);
Takeshi Abe, Utsunomiya (JP); Hisato Oku, Utsunomiya (JP); Yasuki Motozawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 420 days.

(21) Appl. No.: 12/172,474

(22) Filed: Jul. 14, 2008

(65) Prior Publication Data
US 2009/0021061 A1    Jan. 22, 2009

(30) Foreign Application Priority Data

Jul. 20, 2007 (JP) .................................. 2007-189512
Dec. 27, 2007 (JP) .................................. 2007-338091

(51) Int. Cl.
*B60N 2/42* (2006.01)
(52) U.S. Cl. .............................. 297/216.13; 297/452.18
(58) Field of Classification Search ............. 297/216.13, 297/452.18
See application file for complete search history.

(56) References Cited

U.S. PATENT DOCUMENTS

| 4,512,604 | A * | 4/1985 | Maeda et al. ............. 297/216.13 |
| 6,299,238 | B1 * | 10/2001 | Takagi et al. ............. 297/216.13 |
| 7,104,592 | B2 * | 9/2006 | Song ........................ 297/216.13 |
| 2005/0264053 | A1 | 12/2005 | Saberan et al. |

FOREIGN PATENT DOCUMENTS

| DE | 195 21 888 | 11/1996 |
| DE | 100 44 725 | 3/2002 |
| FR | 2 120 277 | 8/1972 |
| GB | 2 399 284 | 9/2004 |
| JP | 52-10570 | 3/1977 |
| JP | 07-266952 | 10/1995 |
| JP | 07-266953 | 10/1995 |
| JP | 2001-149176 | 6/2001 |
| JP | 2005-153839 | 6/2005 |
| JP | 2007-168614 | 7/2007 |

\* cited by examiner

*Primary Examiner* — Anthony D Barfield
(74) *Attorney, Agent, or Firm* — Rankin, Hill & Clark LLP

(57) ABSTRACT

The present invention relates to a vehicle seat that receives by a seatback a load that is input from the side of a vehicle, the vehicle seat including a plate member that has a plurality of uneven portions in which a ridgeline portion extends along the vehicle width direction and is attached to a seatback frame.

14 Claims, 14 Drawing Sheets

VEHICLE SEAT

Priority is claimed on Japanese Patent Application No. 2007-189512, filed Jul. 20, 2007, and Japanese Patent Application No. 2007-338091, filed Dec. 27, 2007, the contents of which are incorporated herein by reference.

BACKGROUND OF THE INVENTION

1. Field of the Invention

The present invention relates to a vehicle seat that has a function of protecting an occupant from a load that is input from the side of the vehicle.

2. Description of Related Art

Since most vehicle seats are not provided with a structure that rigidly receives a load input from the side with a frame, during a side impact to the vehicle or the like, this vehicle seat itself is not capable of efficiently receiving the impact energy.

As a vehicle seat that deals with this problem, a vehicle seat device has been proposed in which a reinforcing member is provided between left and right side frames of a seatback frame having an approximately rectangular frame shape in order to connect both frames, and as a result of that reinforcement the frame strength near the chest height of the occupant is increased (for example, refer to Japanese Unexamined Patent Application, First Publication No. 2005-153839).

This vehicle seat disposes the reinforcing member having a large cross-sectional area in a slanting manner from the exterior side to the interior side in the vehicle width direction, receives the load during a side impact to the vehicle that has been input at the chest height of the occupant by the seatback frame and the reinforcing member, and is able to efficiently transmit the load to a center console portion in the middle in the width direction of the vehicle.

Because many functional components such as a lumbar support for enhancing the riding comfort of the occupant and an active headrest for preventing whiplash are built into the seatback portion of the vehicle seat, and the need to ensure the occupying space on the rear seat side, the thickness in the lengthwise direction of the vehicle tends to be restricted.

However, in the case of actually adopting the abovementioned conventional vehicle seat, since the reinforcing member having a large cross-sectional area is obliquely constructed with respect to the seatback frame, internalization of the functional components and making the seatback have a thin profile become difficult.

The present invention was achieved in view of the above circumstances, and has an object of providing a vehicle seat that can reliably receive a load that is input from the side of the vehicle with the seatback portion without greatly occupying space in the thickness direction of the seatback.

SUMMARY OF THE INVENTION

In order to solve the above problems and achieve the above-mentioned object, the present invention adopts the followings.

(1) A vehicle seat of the present invention receives by a seatback a load that is input from the side of a vehicle, the vehicle seat including a plate member that has a plurality of uneven portions in which a ridgeline portion extends along the vehicle width direction and is attached to a seatback frame.

According to the aforementioned vehicle seat, the plate member is divided into a plurality of regions in the vertical direction by the plurality of uneven portions. Thereby, when an impact load is input from the side of the vehicle to the seatback, the ridge line portions of the uneven portions receive the load. At this time, when one ridgeline portion is about to collapse or bend before another ridgeline portion, a shear stress acts so as to prevent the collapse or bending between mutually adjacent ridgeline portions on the plate member. Therefore, the plate member efficiently receives a load that is input from the side of the vehicle across nearly all the regions thereof.

Accordingly, the plate member that is divided into the plurality of regions in the vertical direction by the ridgeline portions that extend in the vehicle width direction is attached to the seatback frame, and the impact load is received from the side of the vehicle body at nearly all the regions of the plate member. Therefore, it is possible to reliably receive a lateral impact load at the seatback portion without sacrificing space in the thickness direction of the seatback. As a result, according to the present invention, it is possible to readily respond to demands for adding functional components to the seatback and making the seatback thin.

(2) The plate member may be connected to an upper frame, a lower frame, and left and right side frames of the seatback frame having an approximately rectangular frame shape.

In this case, due to the fact that the circumferential edge portion of the plate member is rigidly supported by the seatback frame, it is possible to reliably receive a load that is input from the side of the vehicle body by the seatback frame and the plate member.

Accordingly, due to the fact that the circumferential edge portion of the plate member is supported by the four surrounding frame materials of the seatback frame, the strength of nearly all the regions of the seatback is effectively increased, and it is possible to prevent deformation to outside the surface of the plate member. Therefore, it is possible to reliably generate shear deformation in the plate member and so reliably receive a lateral impact load by the seatback.

(3) The plate member may be provided with an upper cross member that extends in the vehicle width direction at a position of the chest height of an occupant seated in the vehicle seat.

In this case, when a load is input from the side of the vehicle to the seatback at the chest height of the occupant, that load is quickly and reliably transmitted as a load in the vehicle width direction to the plate member via the upper cross member, and the strength of the seatback frame at the chest height position is increased.

Accordingly, it is possible to receive a load that is input from the side of the vehicle to the seatback at the chest height of the occupant by the upper cross member and moreover quickly transmit it from the upper cross member to all regions of the seatback frame via the plate member.

(4) The plate member may be provided with a lateral projection portion that projects to an outer side of a side frame on a vehicle exterior side of a seatback frame.

In this case, a load that is input from the side of the vehicle is transmitted to all regions of the plate member via the lateral projection portion.

Accordingly, by providing the lateral projection portion that projects to the outer side of the side frame on the vehicle exterior side, it is possible to more quickly transmit a load that is input from the side of the vehicle to all regions of the plate member.

(5) The lateral projection portion may be provided with a load receiving portion that bulges in an outside direction of the side frame on the vehicle exterior side of the seatback frame and transmits the load input from the side of the vehicle body to the side frame.

In this case, a load that is input from the side of the vehicle to the lateral projection portion is quickly transmitted to the side frame via the load receiving portion.

Accordingly, since it is possible to transmit a load that is input from the side of a vehicle to the side frame via the load receiving portion of the lateral projection portion, it is possible to more reliably receive the load input from the side of the vehicle by the plate member and the seatback frame.

(6) A lower cross member that extends in the vehicle width direction may be provided at a lower end of the plate member or a lower frame of the seatback frame to which the plate member is joined.

In this case, a load that has been input from the side of the vehicle and transmitted to the lower end side of the plate member is transmitted to the center side in the vehicle width direction such as the center console via the lower cross member. Also, since it is possible to reinforce the lower portion of the plate member by the lower cross member, it is possible to restrict deformation to outside the surface of the plate member.

Accordingly, since it is possible to reliably transmit a load that has been input from the side of the vehicle to the seatback to a member on the center side in the vehicle width direction via the lower cross member, and it is possible to reinforce the lower portion of the plate member by the lower cross member to restrict deformation to outside the surface of the plate member, it is possible to efficiently absorb impact energy by the vehicle.

(7) An upper cross member that projects to an outer side of a side frame on a vehicle exterior side of the seatback frame may be provided at the upper end of the plate member, along the vehicle width direction.

In this case, a load that is input from the side of the vehicle is quickly transmitted to the upper end portion of the plate member via the upper cross member, and so shear stress acts quickly on the plate member.

Accordingly, since a load that is input from the side of the vehicle is quickly transmitted to the upper end portion of the plate member via the upper cross member, by causing a shear stress to act promptly on the plate member at an initial stage of the load input, it is possible to efficiently receive a lateral impact load with the seatback portion.

(8) An upper lateral projection portion may be further provided that covers an exterior side projection portion of the upper cross member.

In this case, the surrounding of the exterior side projection portion of the upper cross member is reinforced by the upper lateral projection portion, and so when a load is input from the side of the vehicle to the upper cross member, deformation of the exterior side projection portion of the upper cross member is prevented.

Accordingly, since the surrounding of the exterior side projection portion of the upper cross member is reinforced by the upper lateral projection portion and deformation of the exterior side projection portion is prevented, it is possible to efficiently transmit a load that is input from the side of the vehicle to the upper portion of the plate member.

(9) A portion of the upper lateral projection portion that is further to the front than the upper cross member may be projected furthest to the exterior side in the vehicle width direction.

In this case, when a load that is input from the side of the vehicle is transmitted to the upper lateral projection portion, the lateral projection portion readily receives the load with the front side portion that is projected furthest to the exterior side in the vehicle width direction. Thereby, a load is input from a position that is offset to the front side with respect to the upper cross member, and so deformation in which the center side in the vehicle width direction of the upper cross member flexes forward is restricted.

Accordingly, since a load is input from a position that is offset to the front with respect to the upper cross member, regardless of the shape of the abutting portion of the vehicle body side portion side, it is possible to restrict flexing toward the front of the center side in the vehicle width direction of the upper cross member, and so possible to cause the input load to be stably received by the plate member.

(10) A structure may be adopted in which: an upper lateral projection portion that projects to the outside of a side frame on the vehicle exterior side of the seatback frame is provided at a position corresponding to the upper end of the plate member; and a lower lateral projection portion that projects to the outside of the side frame is provided at a position corresponding to the lower end of the plate member.

In this case, a load that is input from the side of the vehicle is quickly transmitted to each section corresponding to the upper end portion and the lower end portion of the plate member among the side frame on the vehicle exterior side via the upper lateral projection portion and the lower lateral projection portion.

Accordingly, it is possible to generate stable shear stress in the plate member from an early stage of the load input.

(11) The lower lateral projection portion may project more to the outside in the vehicle width direction than the upper lateral projection portion.

In this case, a load that is input from the side of the vehicle is initially transmitted to a section that corresponds to the lower end portion of the plate member among the side frame on the vehicle exterior side via the lower lateral projection portion, and then subsequently transmitted to a section that corresponds to the upper end portion of the plate member among the side frame on the vehicle exterior side via the upper lateral projection portion. Thereby, since the plate member receives a load from the side at the upper end portion in the state of the lower end section being previously regulated, it is possible to generate stress in a shear direction in a stable manner.

Accordingly, since it is possible to transmit a load that is input from the side of the vehicle to a section that corresponds to the upper end portion of the plate member among the side frame on the vehicle exterior side via the upper lateral projection portion after transmitting the load to a section that corresponds to the lower end portion of the plate member among the side frame on the vehicle exterior side via the lower lateral projection portion, it is possible to efficiently cause shear stress in the plate member in which the displacement of the lower end has been regulated.

DETAILED DESCRIPTION OF THE INVENTION

Figure 1:
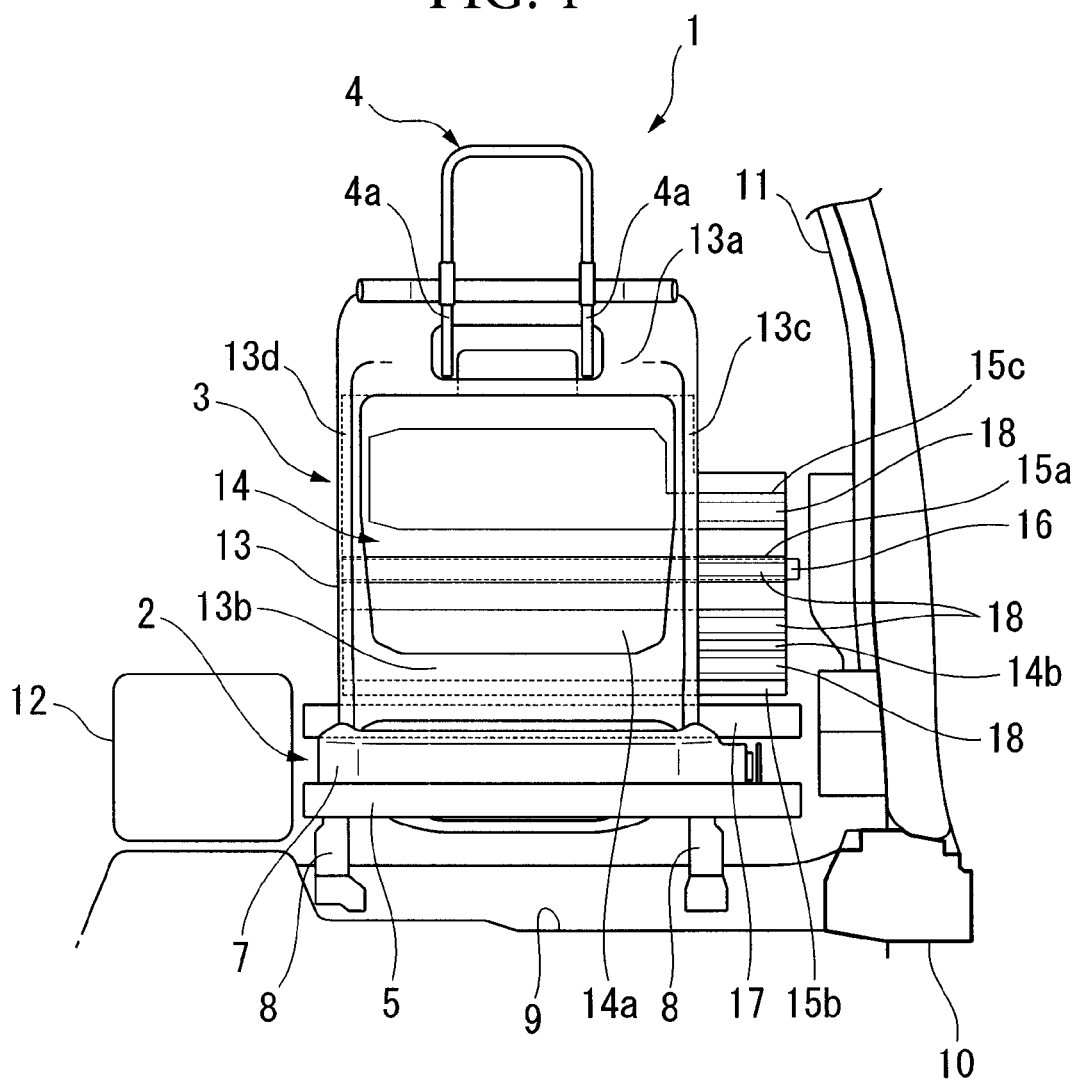
FIG. 1 is a front view that shows a framework of a vehicle seat according to a first embodiment of the present invention.

Hereinbelow, embodiments of the present invention will be described with reference to the appended drawings. Note that identical constituent elements in the descriptions of the embodiments that follow shall be referred to using the same reference numerals, with the explanations thereof being omitted.

Firstly, a first embodiment will be described with reference to FIG. 1 to FIG. 4.

Figure 2:
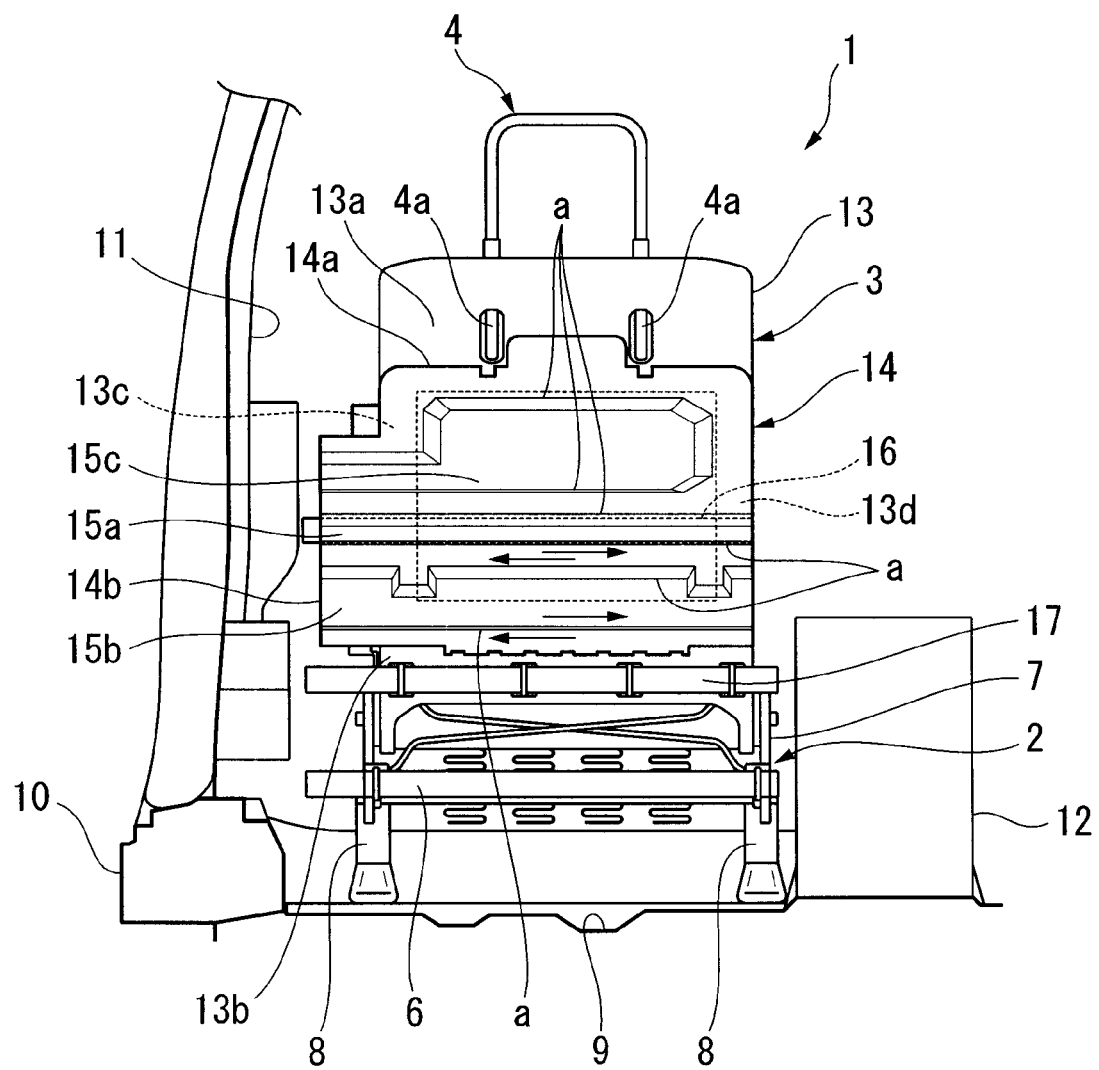
FIG. 2 is a rear view of the vehicle seat.
Figure 3:
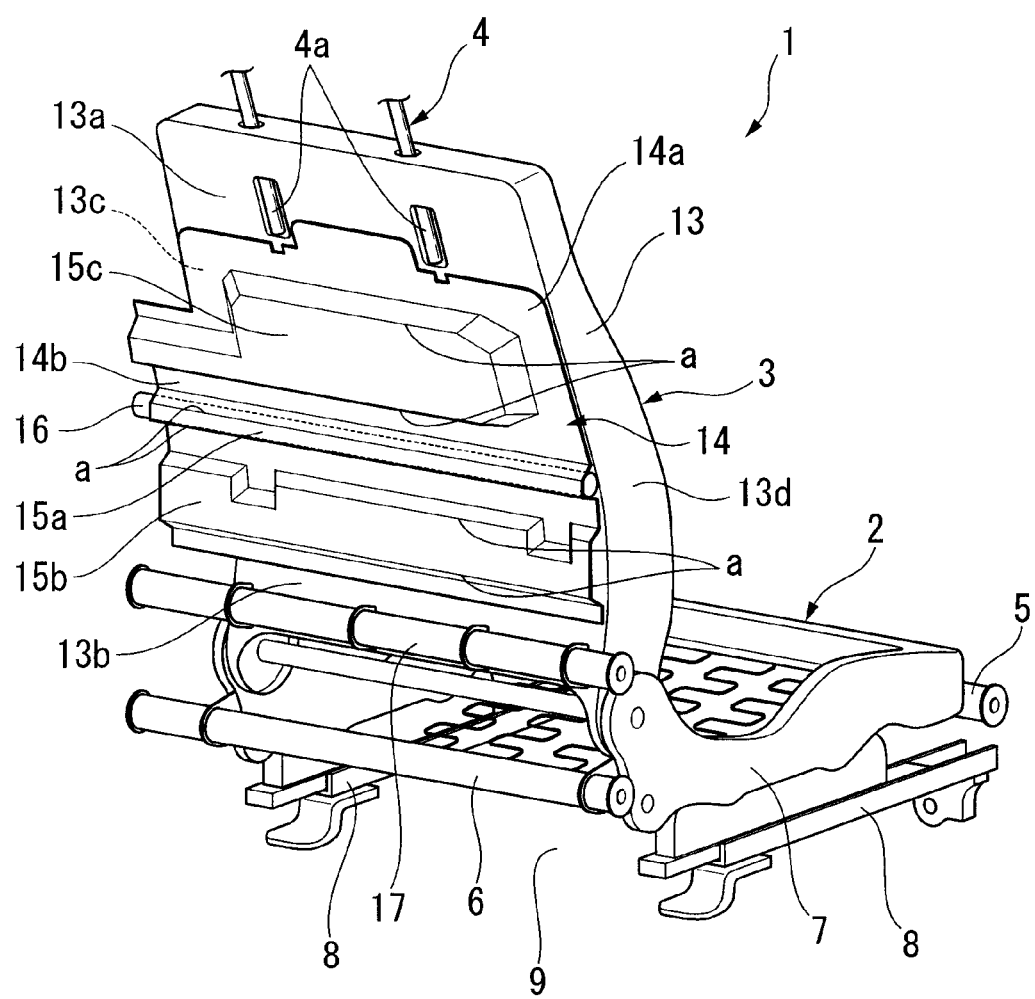
FIG. 3 is a perspective view of the vehicle seat.
Figure 4:
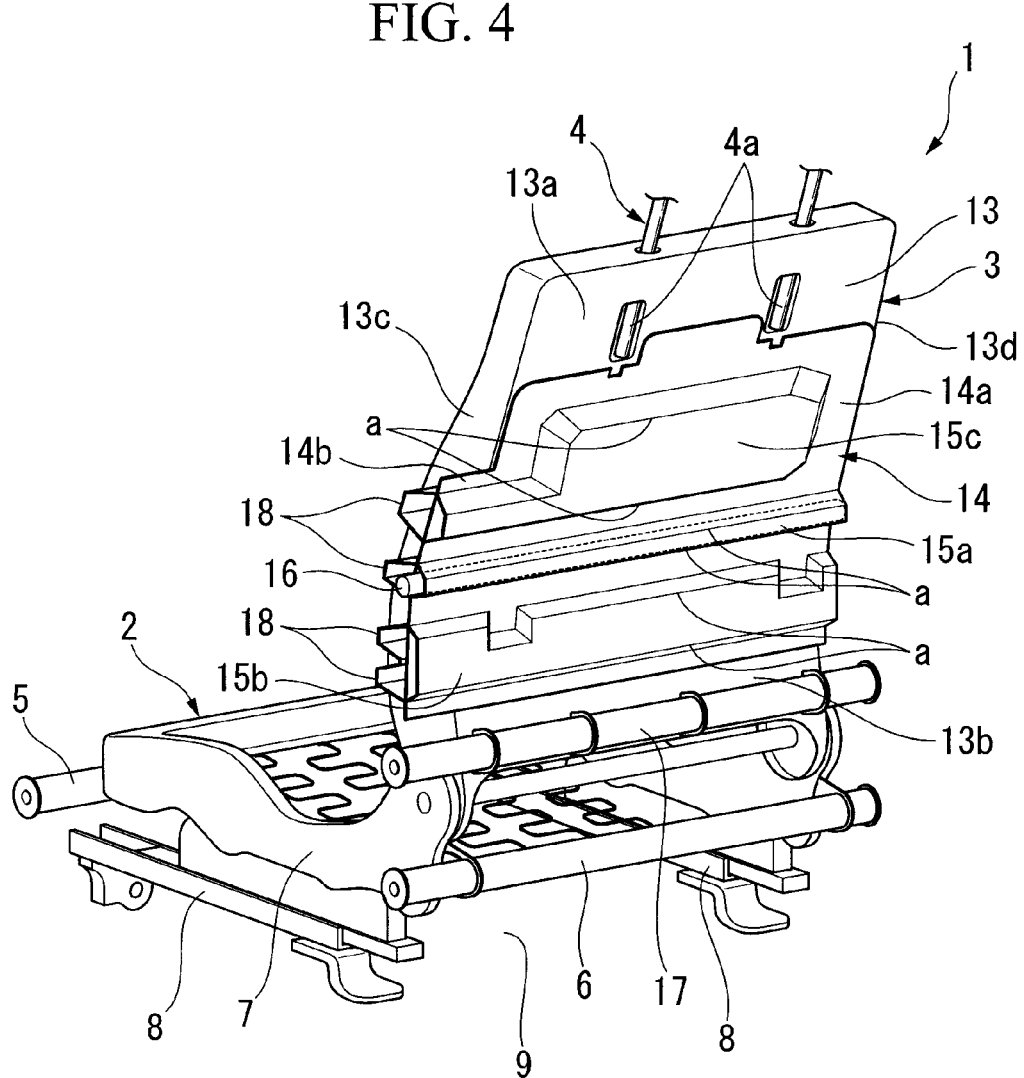
FIG. 4 is a perspective view of the vehicle seat.

FIG. 1 and FIG. 2 show the front view and rear view, respectively, of a vehicle seat 1 according to the present embodiment in the state of being installed in a vehicle. Also, FIG. 3 and FIG. 4 show perspective views of the same vehicle seat 1 viewed obliquely from the right rear side and the left rear side, respectively.

The vehicle seat 1 is provided with a seat cushion 2 that supports the hips of the occupant, a seatback 3 that is connected to the rear end portion of the seat cushion 2 and supports the waist and chest (back portion) of the occupant, and a headrest 4 that is supported by the upper portion of the seatback 3 and supports the head and neck of the occupant.

The seat cushion 2 is provided with a cushion frame 7 to which a front cross member 5 and a rear cross member 6 that extend in the vehicle width direction are attached at the front end portion and the rear end portion. The cushion frame 7 is attached to a vehicle body floor 9 to be capable of sliding in the front-back direction via seat rails 8, 8. Note that in FIG. 1 and FIG. 2, reference numeral 10 denotes a side sill that is provided at the lower end side portion of the vehicle body, reference numeral 11 denotes a center pillar that is installed approximately in the center of the vehicle body side portion, and reference numeral 12 denotes a center console that is fixed and arranged on the vehicle body floor 9 in the center in the vehicle width direction.

The seatback 3 is provided with a seatback frame 13 having an approximately rectangular frame shape that includes an upper frame 13a, a lower frame 13b, and left and right side frames 13c, 13d. The lower end of the seatback frame 13 is hinge coupled in a reclinable manner to the rear end portion of the cushion frame 7. Support frames 4a, 4a of the headrest 4 are attached to be capable of being raised and lowered at the center position in the width direction of the upper frame 13a of the seatback frame 13. Note that the headrest 4 of the present embodiment is an active headrest for preventing whiplash of the occupant during a rear-end collision.

A plate member 14 that forms an approximate L-shape in a frontal view is attached to the back surface side of the seatback frame 13. This plate member 14 includes a plate main body 14a having an approximately rectangular shape with the edge portion thereof coupled to the upper frame 13a, the lower frame 13b, and the left and right side frames 13c, 13d of the seatback frame 13; and a lateral projection portion 14b that projects in an approximate L-shape to the outside of the side frame 13c on the vehicle exterior side of the plate main body 14a. Also, a plurality of ribs 15a, 15b, 15c (uneven portions) in which a ridgeline portion a extends along the vehicle width direction are provided in a manner arranged in parallel in the vertical direction, with an upper cross member 16 of an approximately cylindrical shape and extending in the vehicle width direction being integrally attached inside of the center rib 15a (hereinbelow referred to as a first rib 15a). This upper cross member 16 extends in the vehicle width direction at a position of nearly the chest height of a seated occupant. A region that forms the plate main body 14a at the lower edge of the downside rib 15b (hereinbelow referred to as a second rib 15b) is integrally coupled to the lower frame 13b of the seatback frame 13. Also, in the same way, a region that forms the plate main body 14a at the upper edge of the topside rib 15c (hereinbelow referred to as a third rib 15c) is integrally coupled to the upper frame 13a of the seatback frame 13.

A lower cross member 17 that extends in the vehicle width direction is integrally attached at a position directly below the coupling portion of the lower edge of the plate member 14 to the lower frame 13b of the seatback frame 13. This lower cross member 17 extends in the vehicle width direction at nearly the height of the hips of the seated occupant together with the rear cross member 6 on the seat cushion 2 side, with the end portion on the vehicle exterior side facing the center pillar 11 and the end portion on the vehicle interior side facing the center console 12.

At the lateral projection portion 14b of the frame material 14 that projects to the vehicle exterior side by wrapping around the rear surface side of the side frame 13c, a plurality of load receiving portions 18 that have an approximately triangular cross section are integrally formed, being disposed at the side portion on the vehicle exterior side of the side frame 13c and bulging to the vehicle body front side. Each vehicle interior side end portion of these load receiving portions 18 abuts the side surface of the side frame 13c on the vehicle exterior side, and so when a load is input to the lateral projection portion 14b via the center pillar 11 etc. during a side impact, this load is transmitted over a wide range in the vertical direction of the side frame 13c.

When an impact load is input to the side surface of a vehicle that adopts the vehicle seat 1 having the abovementioned constitution, the center pillar 11 that deforms as a result of the collision abuts the upper cross member 16 and the lateral projection portion 14b of the plate member 14 of the seatback 3. Then, at a timing earlier than the occupant and the center pillar 11 making contact, the collision load is input to them. At this time, the impact load is transmitted to the side frame 13c of the seatback frame 13 via the load receiving portions 18 of the lateral projection portion 14b, and the load is transmitted in the width direction of the plate member 14 centered on the upper cross member 16. In this way, when the load is input to the plate member 14 with the upper cross member 16 serving as the input point of a shear load, a stress in the shear direction acts at a plurality of regions divided by the ridgeline portion a of the ribs 15a, 15b, 15c. Then, the shear stress is transmitted to the upper frame 13a and the lower frame 13b of the seatback frame 13. At this time, since the edge portion of the plate main body 14a is connected to the upper frame 13a, the lower frame 13b, and the left and right side frames 13c, 13d of the seatback frame 13, the stress in the shear direction does not escape to outside the surface of the plate main body 14a. Also, because the lower end of the plate member 14 is reinforced by the lower cross member 17 that extends in the ridgeline direction of the ribs 15a, 15b, 15c, the shear load does not escape downward. Therefore, the plate member 14 receives a load across nearly all regions thereof.

In this way, an impact load that is transmitted to the lower frame 13b is transmitted to the vehicle body floor 9 via the cushion frame 7 and the seat rail 8, and also transmitted to the center console 12 via the lower cross member 17. Accordingly, the impact load is absorbed by the vehicle body floor 9 and the center console 12 without greatly deforming the seatback frame 13.

According to the vehicle seat 1, the plate member 14 that is attached to the seatback frame 13 is divided into a plurality of regions by the ridgeline portions a that extend in the vehicle width direction of the ribs 15a to 15c, and so it is possible to receive a load across all the regions of the plate member 14 by the stress in the shear direction that acts in this plurality of regions. Thereby, while having a thin-walled structure that does not greatly occupy space in the thickness direction of the seatback 3, it is possible to reliably receive an impact load from the side of the vehicle body at the seatback 3 portion. Accordingly, in the case of adopting this vehicle seat 1, functional components such as an active headrest and lumbar support can be readily incorporated in the seatback 3, and it is possible to meet requirements for making the seatback 3 thin.

Also, according to the vehicle seat 1, since the entire region of the circumferential edge portion of the plate member 14 is connected to the four frames 13a to 13d of the seatback frame 13, and it is possible to prevent deformation beyond the surface of the plate member 14, it is possible to reliably cause stress in the shear direction to be generated in the plate member 14. Thereby, since the plate member 14 and the seatback frame 13 raise the strength in cooperation, it is possible to more reliably receive a lateral impact load.

Also, according to the vehicle seat 1, since the upper cross member 16 is disposed at the chest height of the seated occupant, it is possible to directly receive a lateral impact load that is input at that height by the upper cross member 16 with high strength. Moreover, it is possible to reliably transmit a load to the vehicle body floor 9 and the center console 12 via the plate member 14 and the seatback frame 13.

Moreover, according to the vehicle seat 1, since the lateral projection portion 14b that projects to the exterior side of the side frame 13c is provided in the plate member 14, it is possible to more rapidly transmit a lateral impact load to the plate member 14.

In particular, in the present embodiment, since the load receiving portions 18 that directly transmit a load from the center pillar 11 to the exterior side surface of the side frame 13 are provided in the lateral projection portion 14b of the plate member 14, it is possible to rapidly transmit a lateral impact load to the seatback frame 13 in a similar manner.

Also, in this vehicle seat 1, the lower cross member 17 is provided at the lower frame 13b that is positioned at the lower edge of the plate member 14, the end portion of the lower cross member 17 is disposed so as to face the side surface of the center console 12 and the lower portion of the plate member 14 is reinforced by the lower cross member 17, so it is possible to restrict deformation to outside of the surface of the lower side of the plate member 14. Thereby, it is possible to reliably transmit a lateral impact load that is input to the seatback frame 13 to the center console 12 via the lower cross member 17.

Note that in the abovementioned embodiment, the lower cross member 17 is attached to the seatback frame 13, but it may be arranged such that the lower cross member 17 is attached to the lower end of the plate member 14.

Next, a second embodiment of the present invention will be described below with reference to FIG. 5 to FIG. 9.

Figure 5:
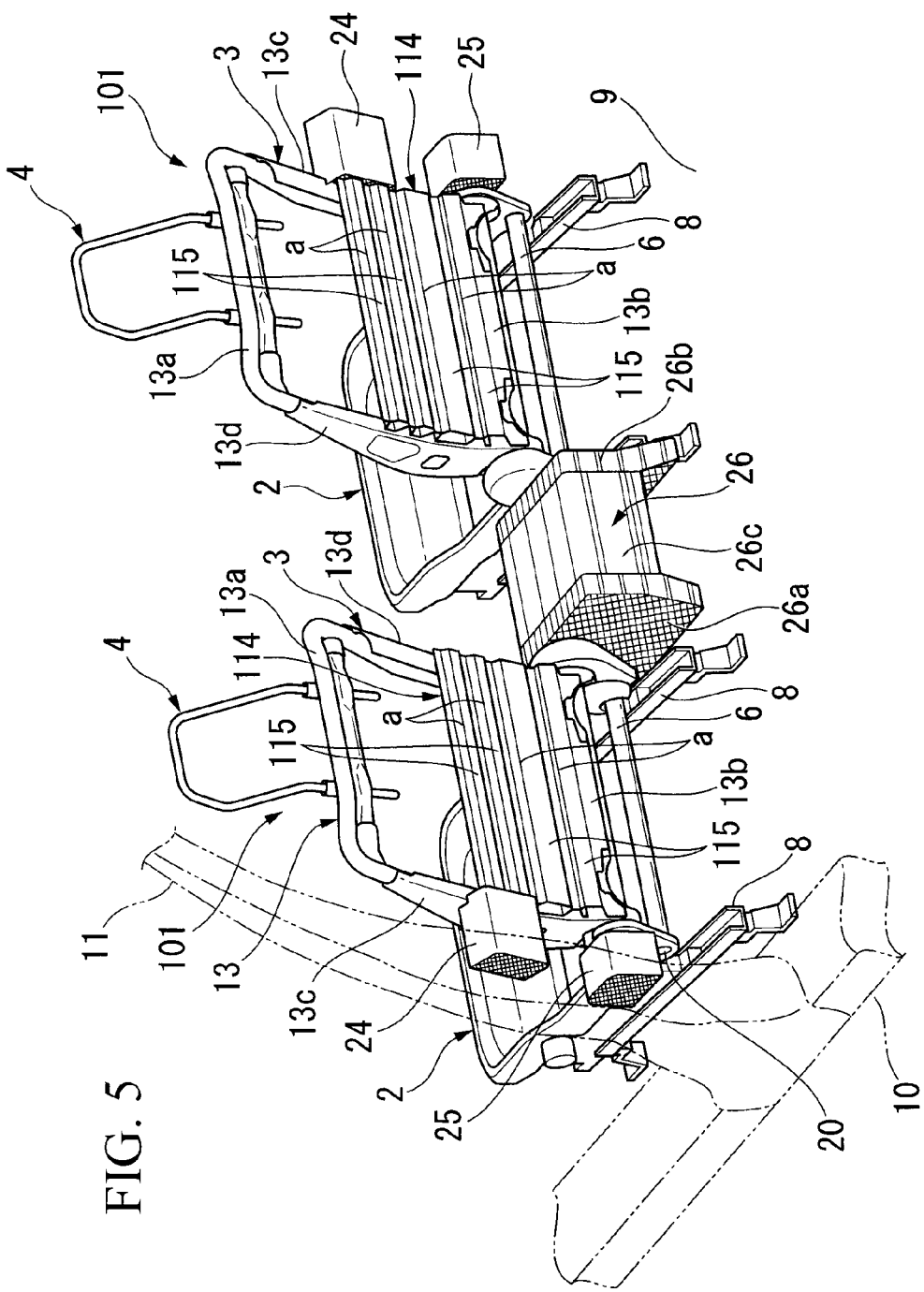
FIG. 5 is a perspective view of a framework of a vehicle seat according to a second embodiment of the present invention.
Figure 6:
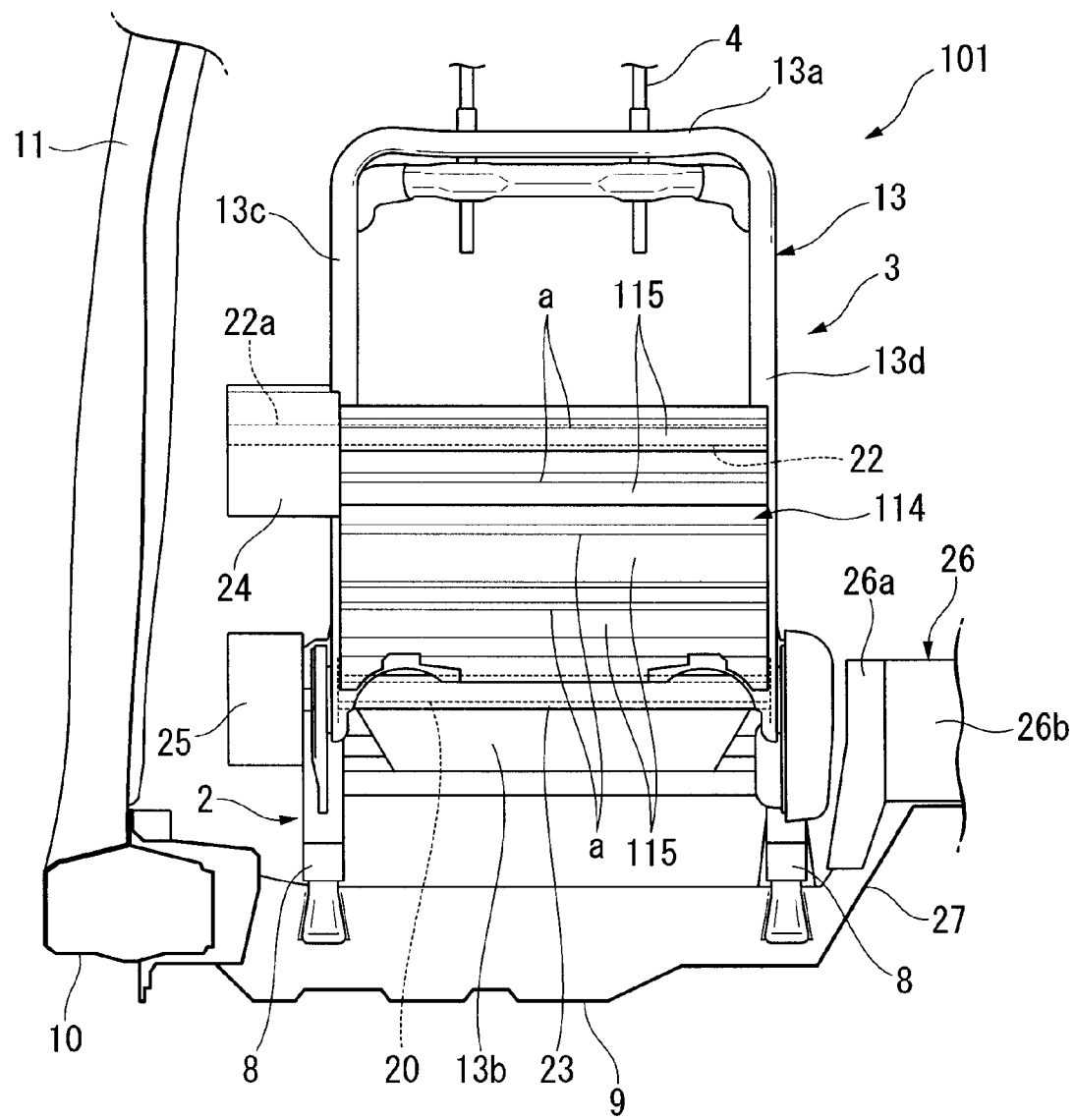
FIG. 6 is a rear view of the vehicle seat.

FIG. 5 and FIG. 6 are a perspective view and a rear view, respectively, showing the state of the vehicle with a vehicle seat 101 according to the present embodiment installed.

The vehicle seat 101 is, similarly to the first embodiment mentioned above, provided with a seat cushion 2, a seatback 3, and a headrest 4, with the seat cushion 2 attached to the vehicle floor 9 via the seat rails 8, 8. The seatback 3 is provided with a seatback frame 13 of an approximately rectangular frame shape that includes an upper frame 13a, a lower frame 13b, left and right side frames 13c, 13d. The lower end of the seatback frame 13 is rotatably attached to the rear end portion of the seat cushion 2 by a hinge shaft 20.

A plate member 114 that has an approximately rectangular shape in a frontal view is attached to the rear surface side of the seatback frame 13. In the present embodiment, the plate member 114 is constituted by two plates provided with corrugated ribs 115 (uneven portions) in which a ridgeline portion a extends in the vehicle width direction being mutually joined to each other.

Figure 7:
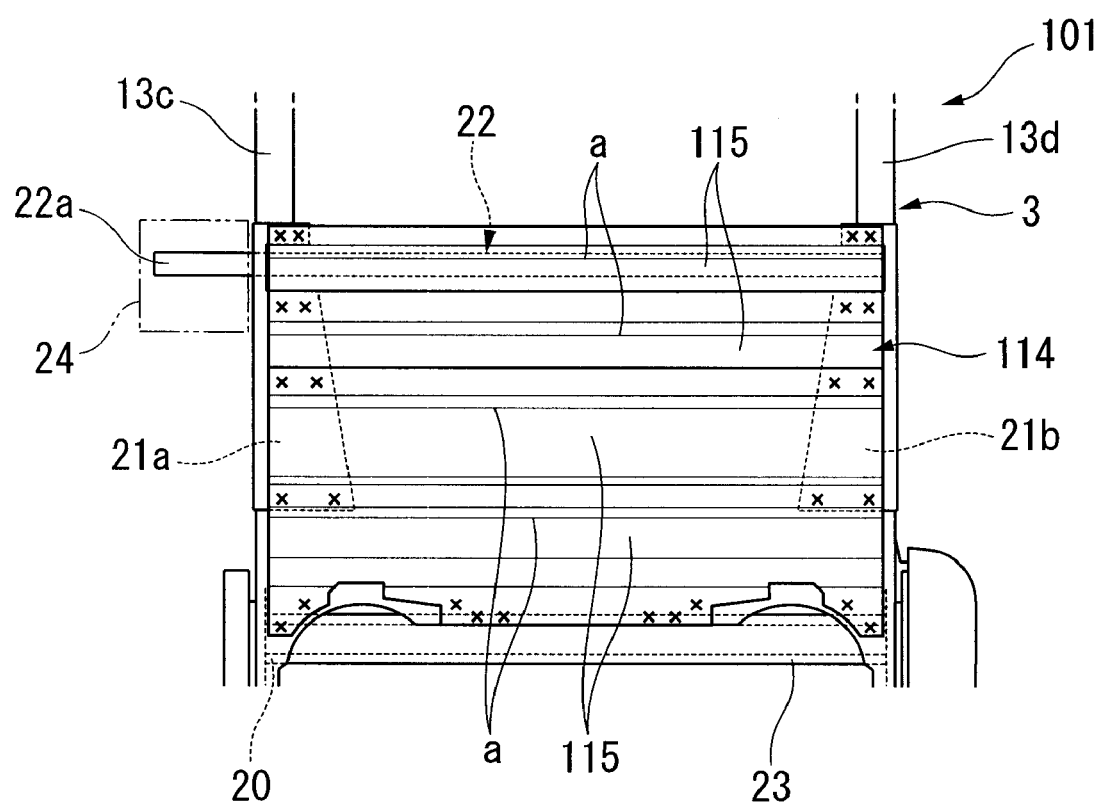
FIG. 7 is a rear view of the vehicle seat.
Figure 8:
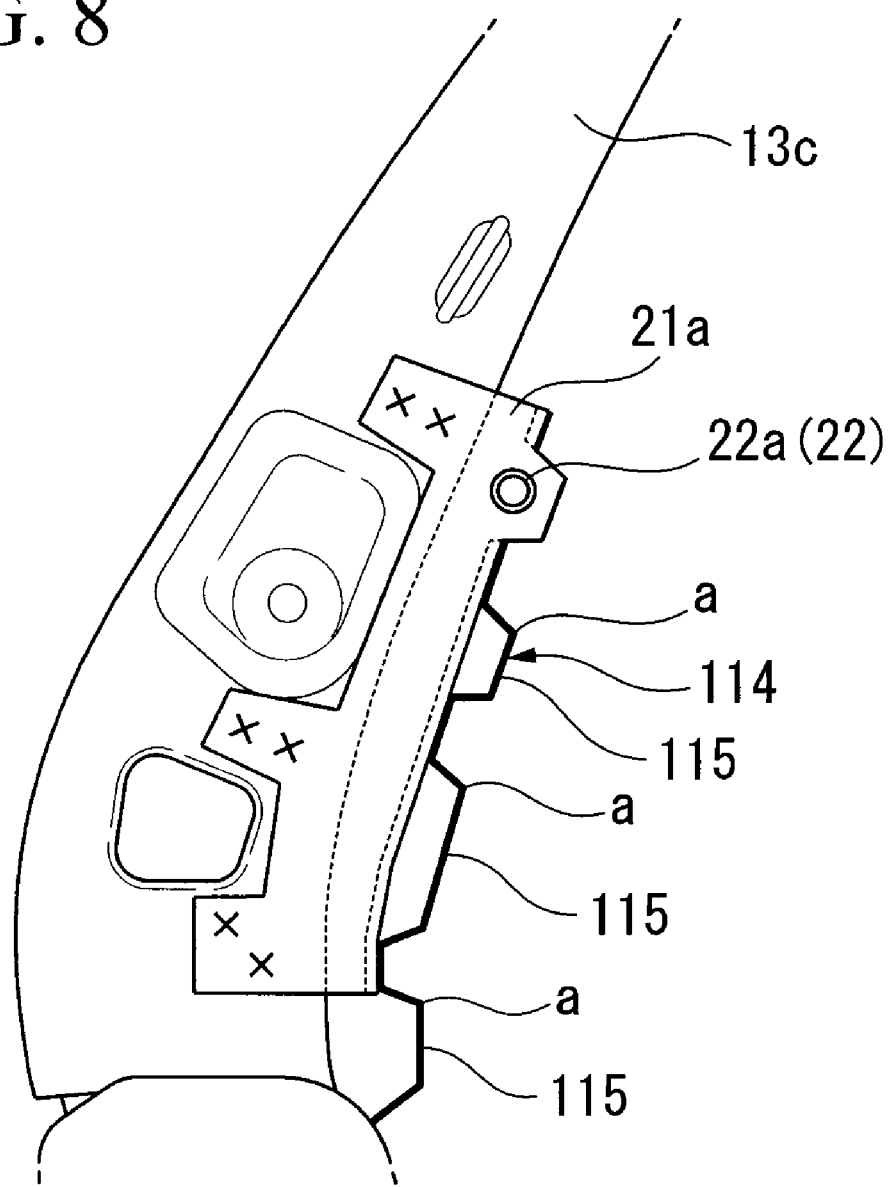
FIG. 8 is a side view of the vehicle seat.

FIG. 7 and FIG. 8 are a rear view and a side surface view, respectively, showing the state of the plate member 114 being attached to the seatback frame 113.

As shown in these drawings, both side portions of the plate member 114 are fixed by welding to brackets 21a, 21b having a cross-sectional L shape that are attached to the left and right side frames 13c, 13d, respectively. A cylindrical upper cross member 22 that extends in the vehicle width direction is fixed by welding to the left and right brackets 21a, 21b. The side end portion on the vehicle exterior side of this upper cross member 22 passes through the bracket 21a to project to the outside of the side frame 13c. In the present embodiment, the plate member 114 is arranged nearly within the width of both side frames 13c, 13d, and the upper end portion thereof is fixed to the upper cross member 22 at nearly the chest height of the occupant, lower than the upper frame 13a.

Also, in the present embodiment, a cylindrical lower cross member 23 is provided coaxially around the hinge shaft 20.

Figure 9:
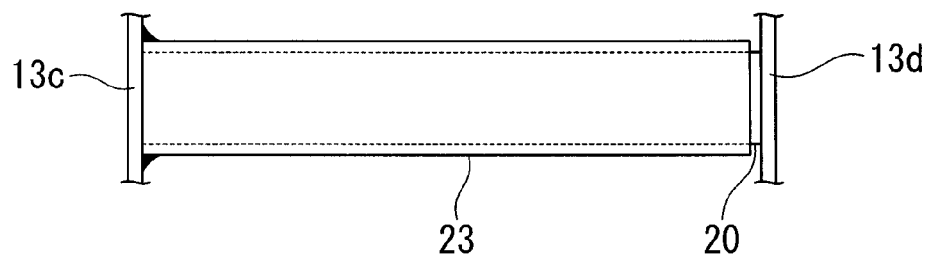
FIG. 9 is a rear view of the vehicle seat.

FIG. 9 is a rear view that shows the attached state of the lower cross member 23 to the seatback frame 13.

As shown in the same drawing, one end side of the lower cross member 23 is fixed by welding in a cantilevered state to the side frame 13c on the vehicle exterior side, while the other end side stands facing the side surface of the side frame 13d on the vehicle interior side in a non-contact state. This other end portion of the lower cross member 23 transmits a load to the side frame 13d by abutting the side frame 13d on the vehicle interior side when a large load has been input from the side of the vehicle body to the side frame 13c on the vehicle exterior side. The lower end of the plate member 114 is fixed by welding to this lower cross member 23.

An upper load transmission block 24 (upper lateral projection portion) and a lower load transmission block 25 (lower lateral projection portion) for transmitting a load input from the vehicle side portion to the side frame 13c are attached to positions corresponding to the upper end portion and lower end portion of the plate member 114, among the side frame 13c. The upper load transmission block 24 and the lower load transmission block 25 each have a honeycomb structure by which a plurality of cylindrical cross sections that extend in the vehicle width direction are arranged in parallel, and the whole is formed as one unit with resin. The rear end edge of the upper load transmission block 24 is formed to bulge in an approximate L shape so as to turn around to the rear of the side frame 13c. Then, the rear end edge of the upper load transmission block 24 that has turned around to the rear of the side frame 13c is butted against the lateral end surface of the plate member 114, and covers a lateral projection portion 22a (exterior side projection portion) of the upper cross member 22 that protrudes from the plate member 114 along the lengthwise direction.

Note that reference numeral 26 in FIG. 5 and FIG. 6 denotes a console reinforcing member that is disposed in the center console not illustrated. This consol reinforcing member 26 includes left and right side walls 26a, 26b with a similar honeycomb structure as the upper load transmission block 24 and the lower load transmission block 25, and a connecting wall 26c that connects the upper regions of the side walls 26a, 26b to each other, and these are fixed in an overlapping state to a floor tunnel 27 within the center console.

According to the vehicle seat 101 in the present embodiment that has the above-described constitution, when the vehicle body side wall such as the center pillar 11 and the like deforms in the seatback 3 direction as a result of an impact load being input from the side of the vehicle, the load from the side wall is transmitted to the side frame 13c via the upper load transmission block 24 and the lower load transmission block 25, and transmitted to the lateral projection portion 22a of the upper cross member 22 that is enclosed by the upper load transmission block 24. At this time, the impact load that is input to the upper load transmission block 24 is transmitted to the side frame 13d on the vehicle interior side via the lower frame 13b, the vehicle interior side end portion of the lower cross member 23 abuts the side frame 13d on the vehicle interior side, and the load is transmitted to below the side frame 13d via this lower cross member 23. In this way, when the impact load is transmitted to below the side frame 13d, the lower end of the side frame 13d abuts the center console, and the input load is supported by the floor tunnel 27 via the console reinforcing member 26 inside. On the other hand, the impact load that is input to the upper cross member 22 is transmitted to the upper end portion of the plate member 114, causing stress in the shear direction to be generated in a plurality of regions separated by the ridgeline portion a of each rib 115 of the plate member 114. Thereby, the input load is received at nearly all the regions of the plate member 114.

Also, both side portions of the plate member 114 are joined to the side frames 13c, 13d, the upper end portion is joined to the upper cross member 22, and the lower end portion is joined to the lower frame 13b and the lower cross member 23. For that reason, during the input of an impact load, the load can reliably generate stress in the shear direction without escaping to outside. Also, in the case of the present invention, the impact load is absorbed by the vehicle body floor 9 and the center console without greatly deforming the seatback frame 13.

Even in this vehicle seat 101, the plate member 114 that is attached to the seatback 3 is divided into a plurality of regions by the ridgeline portions a of the plurality of ribs 115, and so it is possible to receive a load at nearly all the regions of the plate member 114 by the shear stress that acts in those regions. For that reason, it is possible to reliably receive an impact load from the side of the vehicle by the seatback 3 portion without restricting the incorporation of functional components in the seatback 3 or the thinness of the seatback 3.

Then, in this vehicle seat 101, the upper end portion of the plate member 114 is extended in length until the upper cross member 22 that is positioned at nearly the chest height of the seated occupant without being extended to the upper frame 13a.

Also, in this vehicle seat 101, the lateral projection portion 22a that projects further to the vehicle exterior side than the side frame 13c is provided on the upper cross member 22. For this reason, an impact load from the side of the vehicle body can be quickly transmitted as a load in the shear direction to the upper end portion of the plate member 114.

In particular, in the present embodiment, the upper load transmission block 24 for transmitting an impact load from the vehicle body side portion to the side frame 13c is configured to surround the lateral projection portion 22a of the upper cross member 22. Therefore, it is possible to restrict deformation of the lateral projection portion 22a during the input of a load and always cause the impact load to be transmitted to the plate member 114 as desired.

Figure 10:
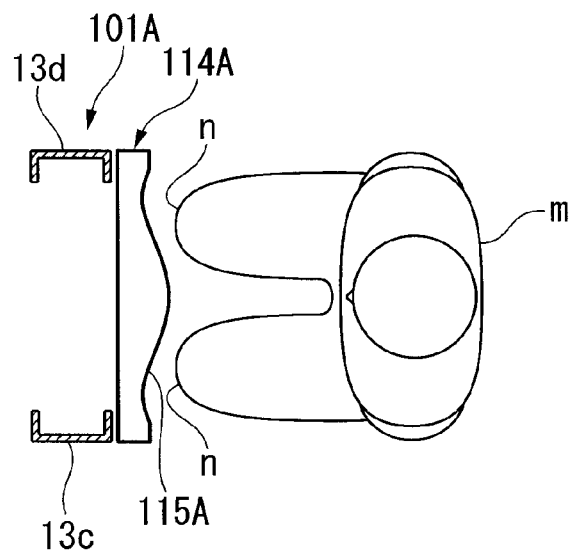
FIG. 10 is a schematic cross-sectional view of a vehicle seat that shows a modified example of the embodiment.
Figure 11:
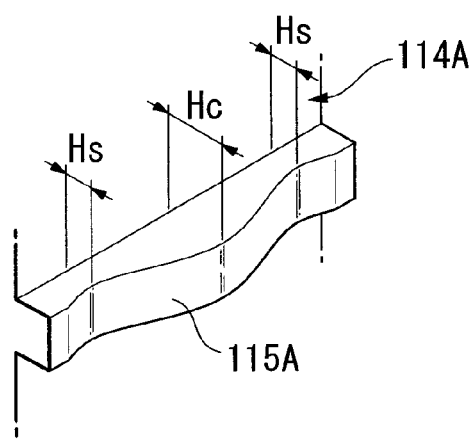
FIG. 11 is a rear view of the vehicle seat according to the modified example.

FIG. 10 and FIG. 11 show a modification of the present embodiment. More specifically, FIG. 10 is a schematic plan view that shows a vehicle seat 101A and an occupant m seated in a backseat, while FIG. 11 is a perspective view of a portion of the vehicle seat 101A.

The vehicle seat 101A of the present modification differs in the shape of ribs 115A that are formed in a plate member 114A. That is, in the case of the forgoing example, each rib 115 had a constant projection height along the vehicle width direction, but in the ribs 115A in the present modification, a projection height Hc in the center portion in the vehicle width direction is the highest, and the projection height Hs in front of the knee position n of the occupant m seated in the backseat is set so as to be the lowest.

In the vehicle seat 101A of the present modification, since the projection height of the rib 115A is set to be the highest at approximately the middle position in the vehicle width direction, it is possible to increase the buckling strength of the plate member 114A (seatback 3) without narrowing the knee space of the backseat occupant m.

Next, a third embodiment of the present invention will be described below with reference to FIG. 12 to FIG. 16.

Figure 12:
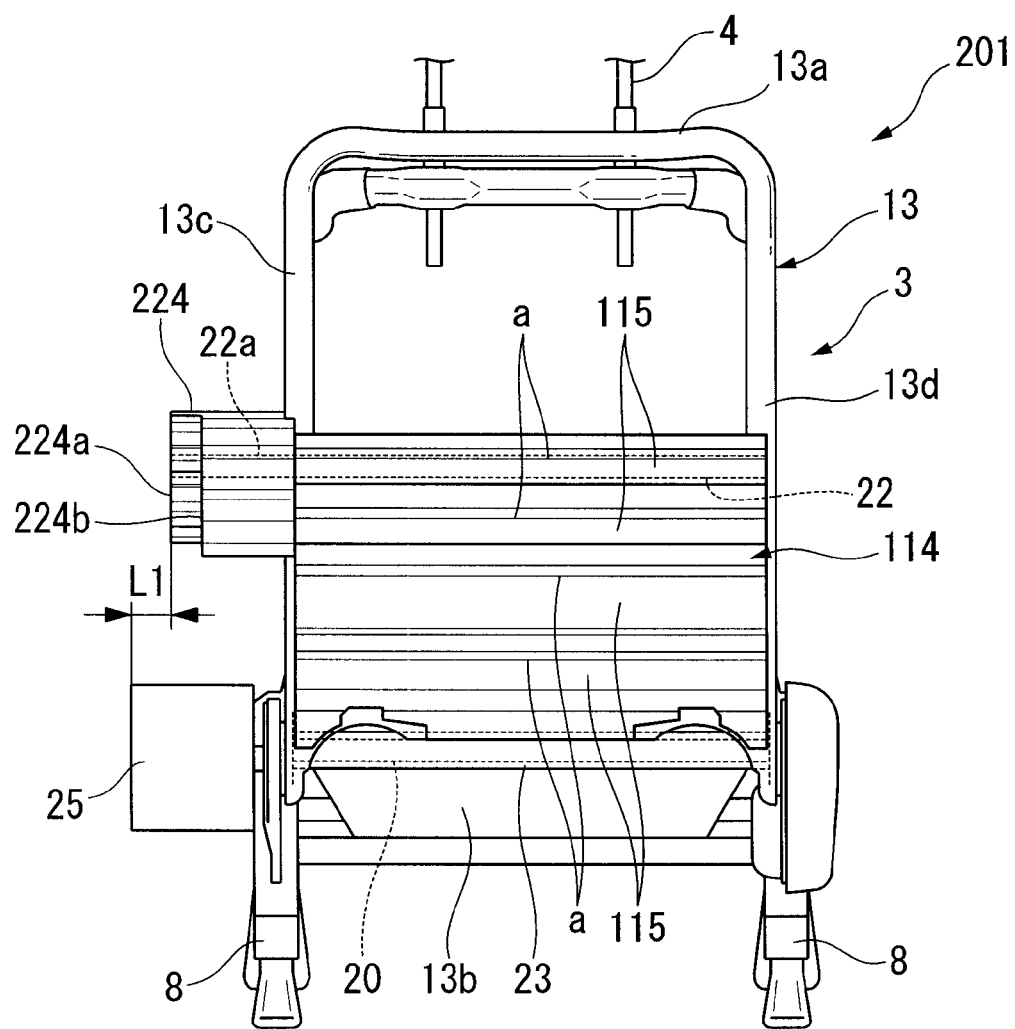
FIG. 12 is a rear view that shows the framework of the vehicle seat according to the third embodiment of the present invention.
Figure 13:
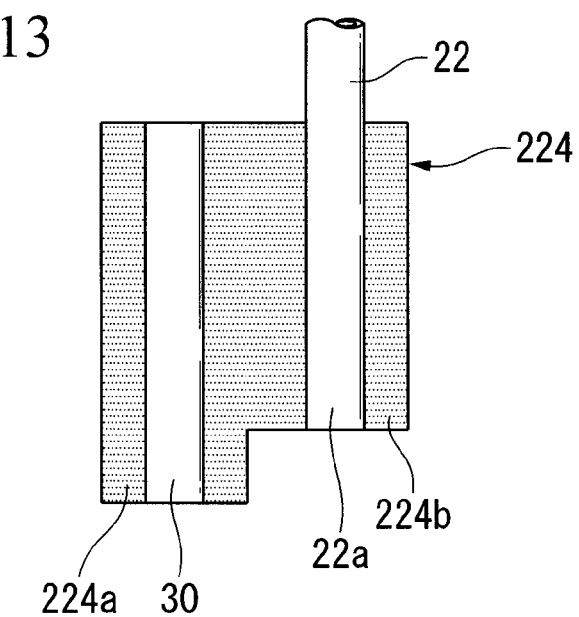
FIG. 13 is a cross-sectional view of the vehicle seat.

FIG. 12 is a rear view of a vehicle seat 201 of the present embodiment, while FIG. 13 is a cross-sectional view in the case of an upper load transmission block 224 that is attached to the side frame 13c being cut in approximately the horizontal direction.

In this vehicle seat 201, similarly to the abovementioned second embodiment, the plate member 114 is attached to the seatback frame 13, the upper cross member 22 and the lower cross member 23 are provided one above the other on the plate member 114, and the upper load transmission block 224 and the lower load transmission block 25 are provided at positions corresponding to the upper and lower ends of the plate member 114 on the vehicle exterior side surface of the side frame 13c. The upper load transmission block 224 is arranged so as to enclose the lateral projection portion 22a of the upper cross member 22, but the projection length to the exterior side in the vehicle width direction is not constant in the front-back direction, having a stepped shape in planar view in which the projection length of a front region 224a is longer than the projection length of a rear region 224b.

The lateral projection portion 22a of the upper cross member 22 is arranged within the rear region 224b of the upper load transmission block 224, and a cylindrical sub-cross member 30 that is a reinforcing member is arranged in the front region 224a along the vehicle width direction.

Also, the lower load transmission block 25 is set so as to project to the exterior side in the vehicle width direction by a set length L1 with respect to the upper load transmission block 224.

According to the vehicle seat 201 of the present embodiment having the constitution of the above explanation, when an impact load is input from the side portion of the vehicle and the vehicle body side wall deforms in the seatback 3 direction, the side wall initially abuts the lower load transmission block 25 and subsequently abuts the front region 224a of the upper load transmission block 224. Thereby, the lower end side of the seatback frame 13 is pressed between the vehicle body side wall and the center console. Then, in this state, the impact load is input to the upper end portion of the plate member 114 via the upper cross member 22. At this time, stress in the shear direction is generated in a plurality of regions separated by the ridgeline portion a of the ribs 115. Accordingly, in this vehicle seat 201, it is possible to efficiently receive a load at nearly all the regions of the plate member 114.

In particular, in the present embodiment, the lower load transmission block 25 projects to the exterior side in the vehicle width direction by a set length L1 with respect to the upper load transmission block 224, and so at the beginning of a collision, the lower end of the seatback frame 13 is first pressed in by the vehicle body side wall and the center console. Therefore, it is possible to reliably receive a load by the plate member 114 in the state of having restricted the collapse of the seatback 3.

Figure 14:
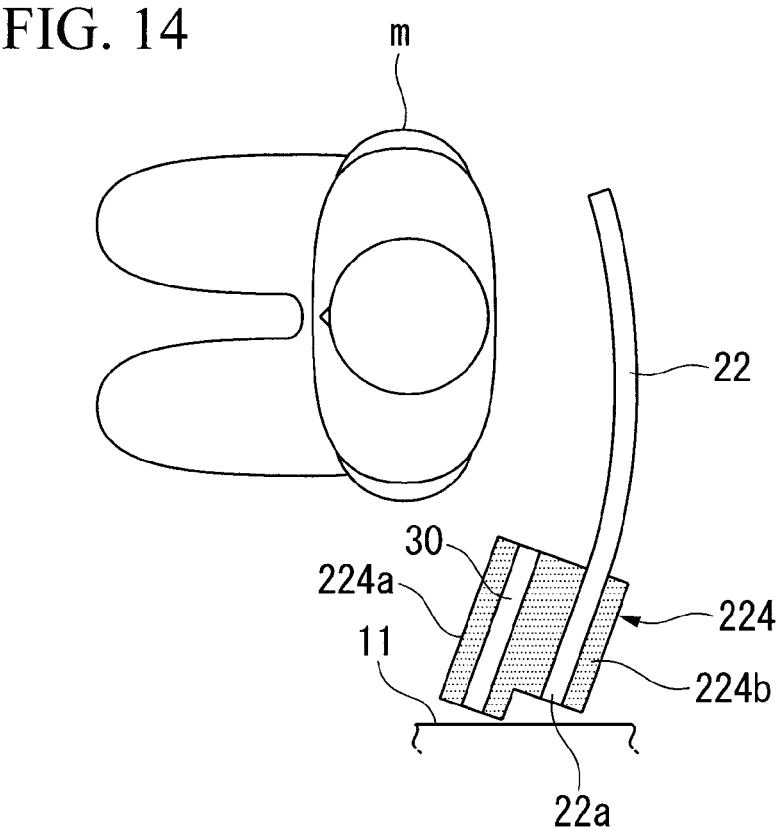
FIG. 14 is a schematic cross-sectional view of the vehicle seat.
Figure 15:
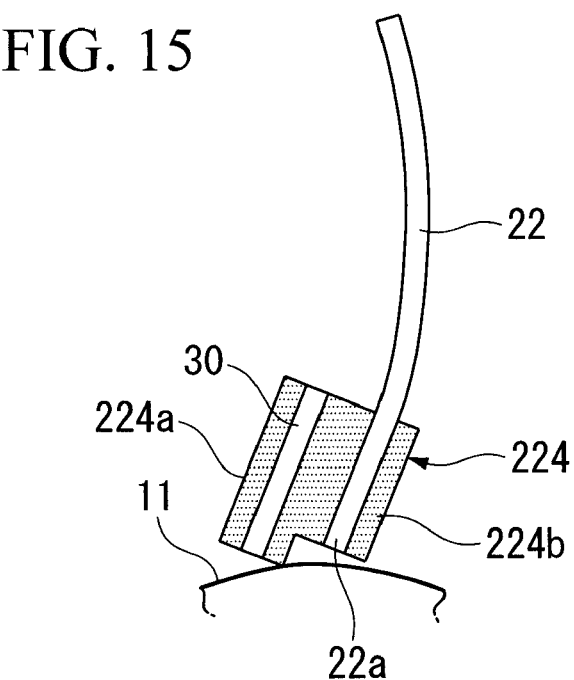
FIG. 15 is a schematic cross-sectional view of the vehicle seat.
Figure 16:
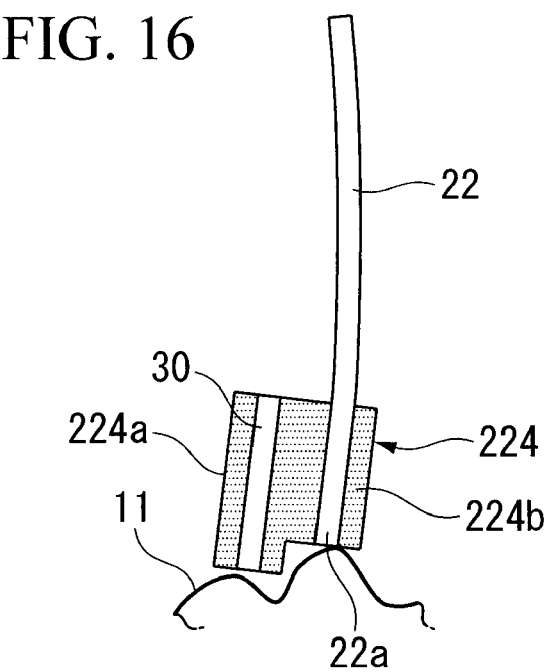
FIG. 16 is a schematic cross-sectional view of the vehicle seat.

Also, in this vehicle seat 201, upper load transmission block 224 is formed in a stepped shape so that the projection length of the front region 224a is longer than the projection length of the rear region 224b. For that reason, during a collision from the side of the vehicle, the vehicle body side wall always first abuts the front region 224a of the upper load transmission block 224 that is offset to the front side with respect to the upper cross member 22, and so deformation such as the center side in the vehicle width direction of the upper cross member 22 flexing forward is restricted. That is, a load is input from a position that is offset to the front to the lateral projection portion 22a of the upper cross member 22. For that reason, as shown in FIG. 14, FIG. 15, and FIG. 16, regardless of the deformation shape of the vehicle body side wall (for example, the center pillar 11), a moment acts in the upper cross member 22 so as to cause the center side in the vehicle width direction to curve to the rear, and as a result of that, bending deformation in the direction of the occupant m in the front seat is restricted. Accordingly, it is always possible to receive a load that is input from the side by the plate member 114 in a stable manner.

Also, in the present embodiment, since the cylindrical sub-cross member 30 is provided in the front region 224a of the upper load transmission block 224, it is possible to transmit a load that is input to the front region 224a to the side frame 13c at an early stage.

Figure 17:
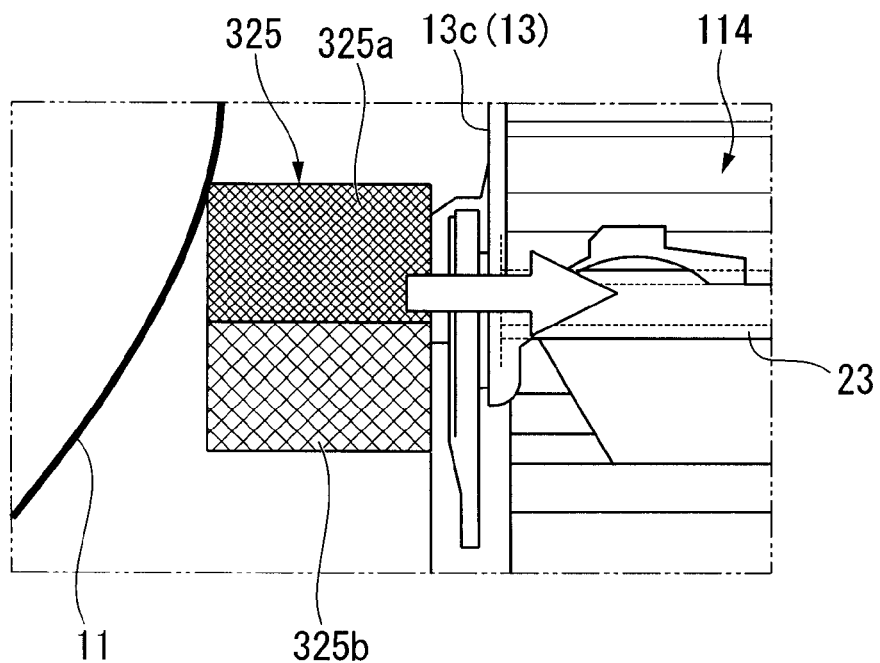
FIG. 17 is a schematic cross-sectional view of a vehicle seat according to a fourth embodiment of the present invention.

FIG. 17 shows a fourth embodiment of the present invention.

In the present embodiment, the density of the honeycomb structure of an upper region 325a of a lower load transmission block 325 that is provided on the side surface of the lower end side of the side frame 13c is set to be higher than the density of the honeycomb structure of a lower region 325b.

For this reason, in the present embodiment, during an impact from the side of the vehicle, when the center region of the center pillar 11 (the region that is separated from the side sill 10 with a high strength) first collapses, it is possible to promptly and reliably transmit the load to the seatback frame 13 with the high density upper region 325a of the lower load transmission block 325. Then, since in the lower load transmission block 325 the density of the lower region 325b is set low with respect to the upper region 325a on which the center pillar 11 collapses early during a collision, it is possible to lighten the overall weight.

Note that in the present embodiment, the density of the upper region 325a of the lower load transmission block 325 is set higher than the density of the lower region 325b, but the area with the higher density is not limited to this, and it is possible to suitably set to an area where the vehicle body side wall advances early or an area where a local advance readily occurs. Also, it is possible to similarly set a high density area and a low density area in the upper load transmission block as well.

Figure 18:
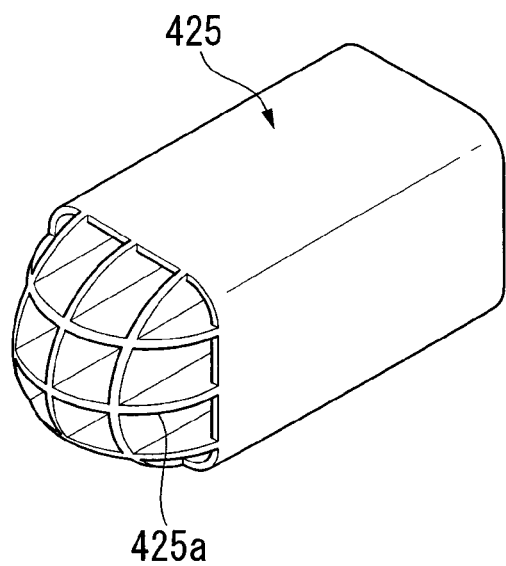
FIG. 18 is a perspective view of a vehicle seat according to a fifth embodiment of the present invention.
Figure 19:
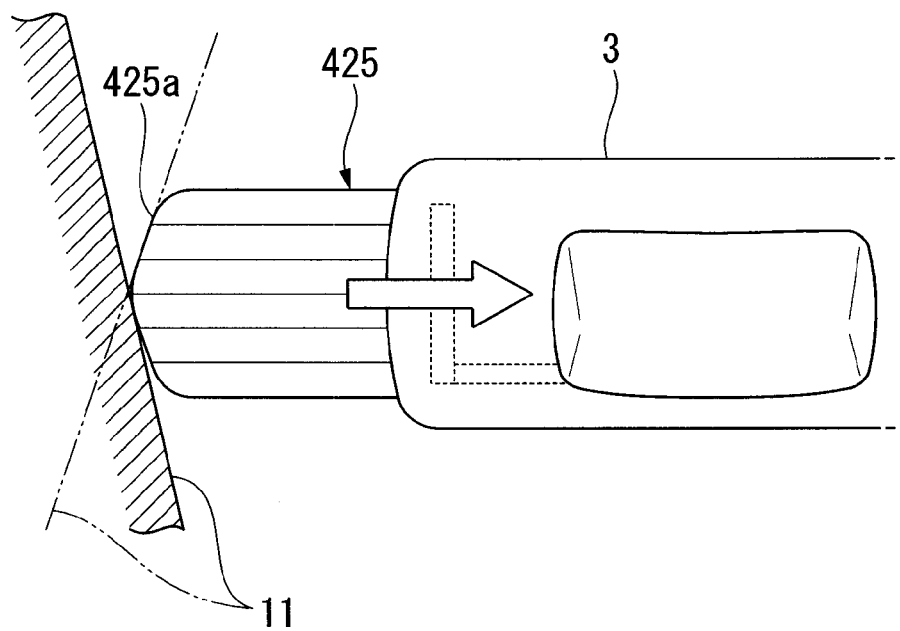
FIG. 19 is a schematic plan view of the vehicle seat.

FIG. 18 and FIG. 19 show a fifth embodiment of the present invention.

In the present embodiment, the end portion on the vehicle exterior side of a lower load transmission block 425 that is provided on the side surface of the lower end said of a side frame is constituted by a hemispherical curved surface 425a.

For this reason, even in the case of the base side of the center pillar 11 having inclined during a side surface impact, the center pillar 11 abuts the curved surface 425a of the lower load transmission block 425, whereby it is possible to reliably transmit the impact load in the vehicle width direction of the seatback 3.

Figure 20:
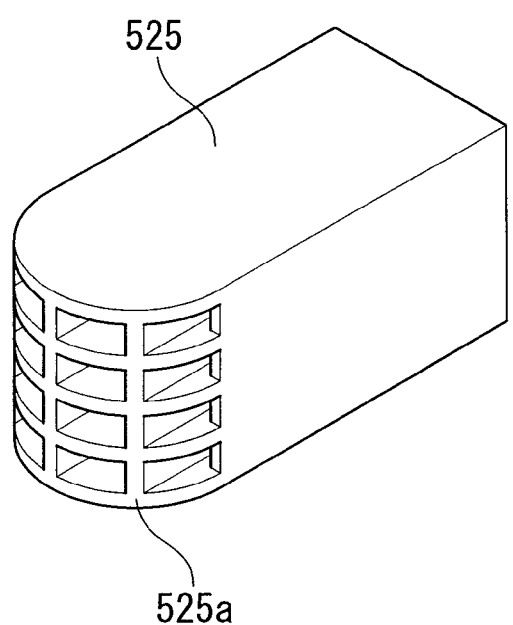
FIG. 20 is a perspective view of the vehicle seat that shows a modified example of the embodiment.

FIG. 20 shows a modification of the above-described fifth embodiment, with the end portion of a lower load transmission block 525 being a semicircle column cross section in which a curved surface 525a is formed in the vehicle front-back direction. In this case, even if the center pillar inclines in the front-back direction during a collision, it is possible to reliably transmit an impact load to the seatback in the vehicle width direction.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle seat that receives by a seatback a load that is input from a side of a vehicle, the vehicle seat comprising:
a seatback frame including a vertically extending first side frame and a vertically extending second side frame, the second side frame being provided on a vehicle exterior side of the seatback frame, the first and second side frames being connected by a laterally extending upper frame that defines a vehicle width direction;
a plurality of uneven portions including a ridgeline portion extending in the vehicle width direction, said plurality of uneven portions are provided to a plate member, and the plate member is attached to the seatback frame; and
an upper cross member extending in the vehicle width direction is connected to an upper portion of the plate member, the upper cross member including a main portion with a free end attached to the first side frame and extending to the second side frame, said upper cross member further including a lateral projection portion extending from the main portion such that a terminal end of the lateral projection portion is offset from the first side frame a distance in the vehicle width direction that is greater than a distance in the vehicle width direction from the first side frame to the second side frame.

2. The vehicle seat according to claim 1, wherein the lateral projection portion that projects to an outer side of the second side frame is provided to the plate member.

3. The vehicle seat according to claim 1, wherein a lower cross member that extends in the vehicle width direction is connected to a lower end of the plate member.

4. The vehicle seat according to claim 1, further comprising:
an upper lateral projection portion covers the lateral projection portion of the upper cross member, that extends further than the second side frame, wherein the upper lateral projection portion has a honeycomb structure by which a plurality of cylindrical cross sections that extend in the vehicle width direction are arranged in parallel.

5. The vehicle seat according to claim 4, wherein a portion of the upper lateral projection portion, that is further to a front than the upper cross member, is projected furthest to an exterior side in the vehicle width direction.

6. The vehicle seat according to claim 1, wherein an upper lateral projection portion that projects to an outer side of the second side frame on the vehicle exterior side of the seatback frame is provided to a position corresponding to an upper end of the plate member;
a lower lateral projection portion that projects to the outer side of the second side frame on the vehicle exterior side of the seatback frame is provided to a position corresponding to a lower end of the plate member; and
the lower lateral projection portion projects more to an outside in the vehicle width direction than the upper lateral projection portion.

7. A vehicle seat that receives by a seatback a load that is input from a side of a vehicle, the vehicle seat comprising:
a plurality of uneven portions in which a ridgeline portion extends along a vehicle width direction are provided to a plate member, and the plate member is attached to a seatback frame;
an upper cross member that extends in a vehicle width direction is connected to an upper portion of the plate member, and the upper cross member is extended to an outer side of a side frame on a vehicle exterior side of the seatback frame; and
an upper lateral projection portion that covers an exterior side projection portion of the upper cross member, that extends further than the side frame.

8. The vehicle seat according to claim 7, wherein a lower cross member that extends in the vehicle width direction is connected to a lower end of the plate member.

9. The vehicle seat according to claim 7, wherein a portion of the upper lateral projection portion, that is further to a front than the upper cross member, is projected furthest to an exterior side in the vehicle width direction.

10. The vehicle seat according to claim 7, wherein the upper lateral projection portion that projects to an outer side of the side frame on a vehicle exterior side of the seatback frame is provided to a position corresponding to an upper end of the plate member;
a lower lateral projection portion that projects to the outer side of the side frame on the vehicle exterior side of the seatback frame is provided to a position corresponding to a lower end of the plate member; and
the lower lateral projection portion projects more to an outside in the vehicle width direction than the upper lateral projection portion.

11. A vehicle seat that receives by a seatback a load that is input from a side of a vehicle, the vehicle seat comprising:
a plurality of uneven portions in which a ridgeline portion extends along a vehicle width direction are provided to a plate member, and the plate member is attached to a seatback frame;
an upper cross member that extends in the vehicle width direction is connected to an upper portion of the plate member, and the upper cross member is extended to an outer side of a side frame on a vehicle exterior side of the seatback frame; and
an upper lateral projection portion that surrounds an exterior side projection portion of the upper cross member, wherein the upper lateral projection portion has a honeycomb structure by which a plurality of cylindrical cross sections that extend in the vehicle width direction are arranged in parallel.

12. The vehicle seat according to claim 11, wherein a lower cross member that extends in the vehicle width direction is connected to a lower end of the plate member.

13. The vehicle seat according to claim 11, wherein a portion of the upper lateral projection portion, that is further to a front than the upper cross member, is projected furthest to an exterior side in the vehicle width direction.

14. The vehicle seat according to claim 11, wherein the upper lateral projection portion that projects to an outer side of the side frame on a vehicle exterior side of the seatback frame is provided to a position corresponding to an upper end of the plate member;
a lower lateral projection portion that projects to the outer side of the side frame on the vehicle exterior side of the seatback frame is provided to a position corresponding to a lower end of the plate member; and
the lower lateral projection portion projects more to an outside in the vehicle width direction than the upper lateral projection portion.

* * * * *